United States Patent
Aliani et al.

(10) Patent No.: US 11,564,111 B2
(45) Date of Patent: Jan. 24, 2023

(54) SYSTEMS AND METHODS FOR LOCATING AND RESOLVING INADVERTENT INTERFERENCE WITH A THIRD-PARTY COMMUNICATION DEVICE

(71) Applicant: ATC Technologies, LLC, Reston, VA (US)

(72) Inventors: Maqbool Aliani, Fairfax, VA (US); Mike Johnson, Leesburg, VA (US); Katya Share, Broadlands, VA (US); Oleksiy Shevchenko, Broadlands, VA (US); Shervin Gerami, Ashburn, VA (US)

(73) Assignee: ATC Technologies, LLC, Reston, VA (US)

( * ) Notice: Subject to any disclaimer, the term of this patent is extended or adjusted under 35 U.S.C. 154(b) by 0 days.

(21) Appl. No.: 16/146,661

(22) Filed: Sep. 28, 2018

(65) Prior Publication Data
US 2019/0098513 A1 Mar. 28, 2019

Related U.S. Application Data

(60) Provisional application No. 62/564,643, filed on Sep. 28, 2017.

(51) Int. Cl.
*H04W 24/02* (2009.01)
*H04W 4/02* (2018.01)
(Continued)

(52) U.S. Cl.
CPC .......... *H04W 24/02* (2013.01); *H04W 4/023* (2013.01); *H04W 4/029* (2018.02); *H04W 52/243* (2013.01)

(58) Field of Classification Search
CPC ...... H04W 24/02; H04W 4/029; H04W 4/023
See application file for complete search history.

(56) References Cited

U.S. PATENT DOCUMENTS

2004/0028003 A1* 2/2004 Diener ................. H04L 1/0001
370/319
2008/0310320 A1 12/2008 Kim et al.
(Continued)

FOREIGN PATENT DOCUMENTS

WO 2014193217 12/2014
WO 2017142453 8/2017

OTHER PUBLICATIONS

PCT/US2018/053507 International Search Report and Written Opinion dated Dec. 13, 2018 (19 pages).
(Continued)

*Primary Examiner* — Zhitong Chen
(74) *Attorney, Agent, or Firm* — Michael Best & Friedrich LLP

(57) ABSTRACT

A system includes a base station and a server. The server includes a communication interface, a memory, and an electronic processor communicatively connected to the memory. The communication interface is configured to communicate with one or more base stations including the base station. The electronic processor is configured to receive location information of a third-party communication device that has received interference, determine whether the third-party communication device is located within a threshold distance from the base station based on a first interference radius associated with the base station, and output one or more resolution options to resolve interference between the base station and the third-party communication device in response to determining that the third-party communication device is located within the threshold distance from the base station.

21 Claims, 3 Drawing Sheets

(51) Int. Cl.
*H04W 4/029* (2018.01)
*H04W 52/24* (2009.01)

(56) References Cited

U.S. PATENT DOCUMENTS

| | | |
|---|---|---|
| 2009/0247181 A1 | 10/2009 | Palanki et al. |
| 2009/0264123 A1 | 10/2009 | Agashe et al. |
| 2010/0029262 A1 | 2/2010 | Wang et al. |
| 2010/0267408 A1* | 10/2010 | Lee .................... H04W 52/243 455/509 |
| 2011/0159898 A1 | 6/2011 | Venkatachalam |
| 2011/0237272 A1* | 9/2011 | Gorokhov .............. H04B 7/024 455/452.1 |
| 2013/0150106 A1* | 6/2013 | Bucknell ................ H04W 4/70 455/501 |
| 2014/0050146 A1* | 2/2014 | Chrisikos ............. H04W 16/14 370/328 |
| 2014/0235175 A1* | 8/2014 | Fu ........................ H04B 1/1027 455/63.1 |
| 2014/0256322 A1* | 9/2014 | Zhou ..................... H04W 36/20 455/436 |
| 2015/0139048 A1* | 5/2015 | Lou ........................... H04L 5/14 370/280 |
| 2015/0156647 A1* | 6/2015 | Braun ................. H04W 52/242 455/426.1 |

OTHER PUBLICATIONS

European Patent Application No. 18860071.2 extended European search report and European search opinion dated May 21, 2021.

* cited by examiner

SYSTEMS AND METHODS FOR LOCATING AND RESOLVING INADVERTENT INTERFERENCE WITH A THIRD-PARTY COMMUNICATION DEVICE

CROSS-REFERENCE TO RELATED APPLICATION

This application claims the benefit of U.S. Provisional Application No. 62/564,643, filed on Sep. 28, 2017, the entire content of which is hereby incorporated by reference.

FIELD

The present disclosure relates generally to wireless communication systems. More specifically, the present disclosure relates to locating and resolving inadvertent interference with a third-party communication device.

BACKGROUND

For conventional wireless networks, the frequency band that a wireless network utilizes is determined via an allocation by a public or private regulating entity. Conventionally, when a wireless network is communicating over long distances, another wireless network is not authorized to communicate over the same frequency band in the region.

However, in certain circumstances, a wireless network communicates over long distances using a frequency band allocated by the public or private regulating entity, but base stations while operating only in the allocated frequency band may still inadvertently interfere with a third-party communication device operating on a different frequency band. This inadvertent interference may be harmful interference caused by poor radio frequency (RF) filtering on the third-party communication device or other interference-causing issues at the third-party communication device. Harmful interference is defined as interference that "endangers the functioning of a radio navigation device service or of other safety services or seriously degrades, obstructs, or repeatedly interrupts a radiocommunication service operating in accordance with Radio Regulations." See e.g., 47 C.F.R. § 2.1(c).

For example, one or more base stations that provides the wireless network may inadvertently interfere with communications between GPS receivers and GPS satellites due to improper filtering or other interference-causing issues at the GPS receivers. Accordingly, there is a need to locate and resolve inadvertent interference, and in particular, inadvertent harmful interference with a third-party communication device.

SUMMARY

In one independent aspect, a server includes a communication interface, a memory, and an electronic processor communicatively connected to the memory. The communication interface is configured to communicate with one or more base stations. The electronic processor is configured to receive location information of a third-party communication device that has received interference, determine whether the third-party communication device is located within a threshold distance from a base station of the one or more base stations, the threshold distance based on a first interference radius associated with the base station, and output one or more resolution options to resolve interference between the base station and the third-party communication device in response to determining that the third-party communication device is located within the threshold distance from the base station.

In another independent aspect, a method for locating and resolving inadvertent interference includes receiving, with an electronic processor, location information of a third-party communication device that has received interference. The method includes determining, with the electronic processor, whether the third-party communication device is located within a threshold distance from a base station, the threshold distance based on a first interference radius associated with the base station. The method also includes outputting, with the electronic processor, one or more resolution options to resolve interference between the base station and the third-party communication device in response to determining that the third-party communication device is located within the threshold distance from the base station.

In yet another independent aspect, a system includes a base station and a server. The server includes a communication interface, a memory, and an electronic processor communicatively connected to the memory. The communication interface is configured to communicate with one or more base stations including the base station. The electronic processor is configured to receive location information of a third-party communication device that has received interference, determine whether the third-party communication device is located within a threshold distance from the base station, the threshold distance based on a first interference radius associated with the base station, and output one or more resolution options to resolve interference between the base station and the third-party communication device in response to determining that the third-party communication device is located within the threshold distance from the base station.

DETAILED DESCRIPTION OF EXEMPLARY EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
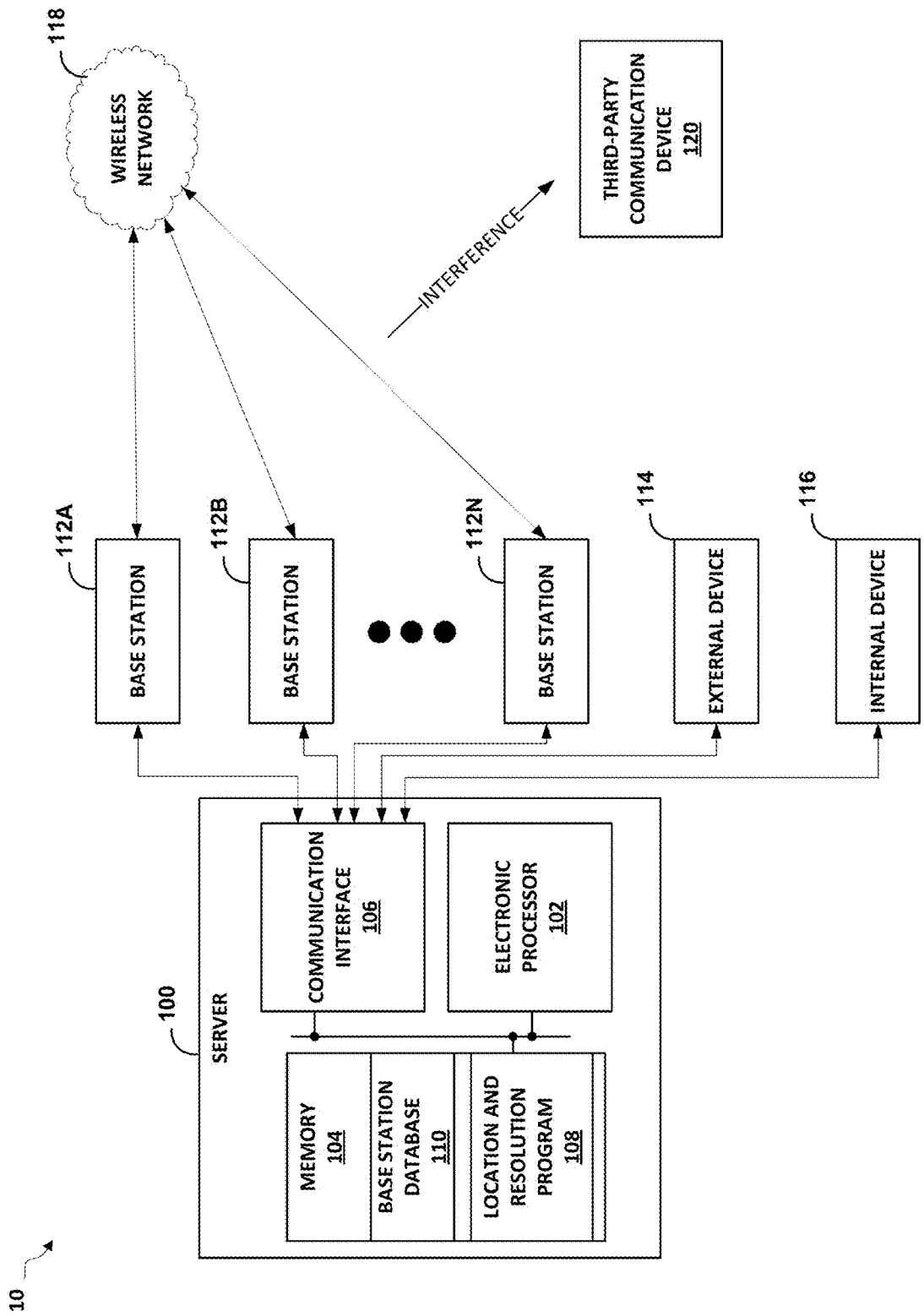
FIG. 1 is a block diagram illustrating a wireless communication system including a server for locating and resolving inadvertent interference with a third-party communication device, in accordance with various aspects of the present disclosure.

FIG. 1 is a block diagram illustrating a wireless communication system 10 including a server 100 for locating and resolving inadvertent interference with a third-party communication device 120. It should be understood that, in some embodiments, server 100 may be implemented in two or more servers in configurations different from that illustrated in FIG. 1. The functionality described herein may be extended to any number of servers for locating and resolving inadvertent interference with a third-party communication device with base stations providing any number of wireless networks.

In the example of FIG. 1, the server 100 includes an electronic processor 102 (for example, a microprocessor or another suitable processing device), a memory 104 (for example, a non-transitory computer-readable storage medium), and a communication interface 106. It should be understood that, in some embodiments, the server 100 may include fewer or additional components in configurations different from that illustrated in FIG. 1. Also the server 100 may perform additional functionality than the functionality described herein. In addition, the functionality of the server 100 may be incorporated into other servers, radio nodes of the server 100, or other suitable processing devices. As illustrated in FIG. 1, the electronic processor 102, the memory 104, and the communication interface 106 are electrically coupled by one or more control or data buses enabling communication between the components.

The memory 104 may include a program storage area (for example, read only memory (ROM)) and a data storage area (for example, random access memory (RAM), and other non-transitory, machine-readable medium). In some examples, the program storage area may store the instructions regarding a location and resolution program 108 as described in greater detail below. In some examples, the data storage area may store a base station database 110. The base station location database 110 includes the location of each of the plurality of base stations 112A-112N (for example, the latitude and longitude of each of the plurality of base stations 112A-112N).

The electronic processor 102 executes machine-readable instructions stored in the memory 104. For example, the electronic processor 102 may execute instructions stored in the memory 104 to perform the location and resolution program 108 and/or access the base station database 110.

The communication interface 106 receives data from and provides data to devices external to the server 100, such as a plurality of base stations 112A-112N, an external device 114, and an internal device 116. For example, the communication interface 106 may include a port or connection for receiving a wired connection (for example, an Ethernet cable, fiber optic cable, a telephone cable, or the like), a wireless transceiver, or a combination thereof.

Figure 3:
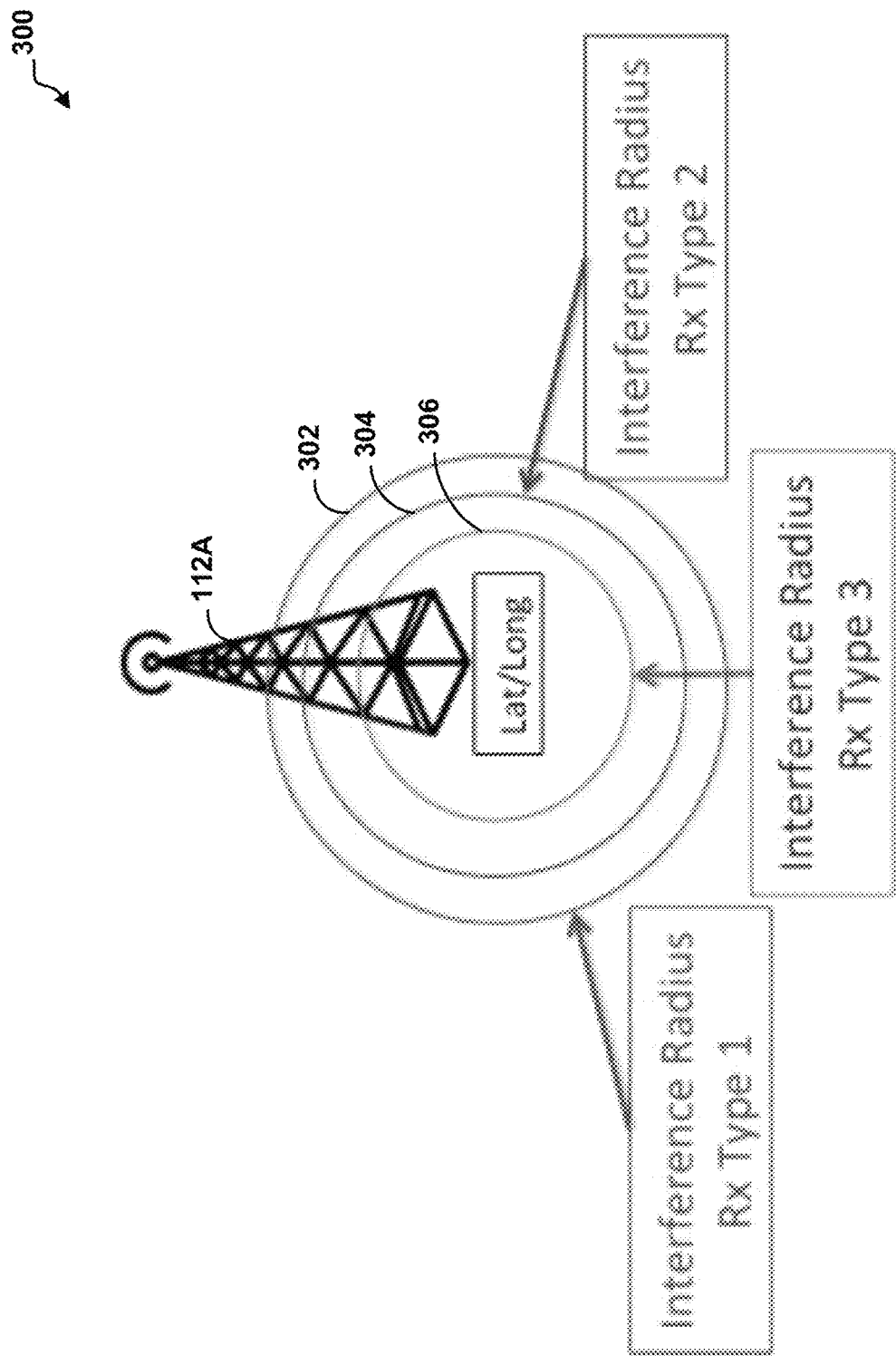
FIG. 3 is a diagram illustrating base station with three threshold distances, in accordance with various aspects of the present disclosure.

The location and resolution program 108 includes computer-readable instructions for determining whether the third party communication device 120 is within a threshold distance of one of the plurality of base stations 112A-112N. For example, the electronic processor 102 executes the location and resolution program 108 to determine the closest one or more base stations from the plurality of base stations 112A-112N by accessing the base station location database 110 and determining the closest distances between the locations of the plurality of base stations 112A-112N and a location of the third-party communication device 120. After determining the closest distances, the electronic processor 102 executes the location and resolution program 108 to determine whether the closest distances between the locations of the plurality of base stations 112A-112N and the location information of the third-party communication device 120 is within a threshold distance or threshold distances. For example, FIG. 3 is a diagram 300 illustrating base station 112A with three threshold distances 302, 304, and 306.

In some examples, the location and resolution program 108 includes instructions to determine an interference radius associated with each type of base station and antenna. For example, the location and resolution program 108 may include instructions to periodically request a signal strength of each base station of the plurality of base stations 112A-112N, and instructions that calculate the interference radius associated with each base station based on the signal strength that is received periodically. Additionally or alternatively, in some examples, the location and resolution program 108 may include instructions to request landscape parameters of each base station of the plurality of base stations 112A-112N, and instructions that calculate the interference radius associated with each base station based on the landscape parameters that are received. The landscape parameters may include one or more parameters indicative of objects, buildings, mountains, hills, and/or a type of environment (for example, a city environment, a forest environment, or a water environment).

In some examples, the location and resolution program 108 includes computer-readable instructions to track interference check activities and displays some or all of the interference check activities on a map for analysis by a user. In some examples, the base station database 110, for each base station of the plurality of base stations 112A-112N, includes a name, coordinates, a status, and/or planned deployments. In some examples, the location and resolution program 108 may include computer-readable instructions to perform data validation upon importing including data structure validation, empty field validations, duplication removal, and/or location errors. In some examples, the location and resolution program 108 may also generate a detailed error report. In some examples, the location and resolution program 108 may also track and display a detailed log of interference search activities regarding a specific third-party communication device, the log including both positive and negative results. For example, the positive results may include a search ID number, a user ID, coordinates of the third-party communication device 120, the serial number of the third-party communication device 120, model name and antenna name of the third-party communication device 120, and/or base station name or base station names with distance relative to the third-party communication device 120. The serial number of the third-party communication device 120 may be stored in the memory 104 to track whether the third-party communication device 120 is moved to a different area and interferes with a different base from the plurality of base stations 112A-112N.

In some examples, the location and resolution program 108 includes computer-readable instructions to generate a graphical user interface to display some or all of the above information to a user. For example, the location and resolution program 108 may generate a graphical user interface that displays the names and locations of the base stations that interfered with the poorly filtered third-party communication device 120.

The plurality of base stations 112A-112N includes one or more radio nodes (not shown) that transmit information via the wireless network 118. In some instances, the one or more radio nodes include a gateway radio node.

In some examples, the server 100 may include one or more optional user interfaces (not shown). The one or more optional user interfaces include one or more input mechanisms (for example, a touch screen, a keypad, a button, a knob, and the like), one or more output mechanisms (for example, a display, a printer, a speaker, and the like), or a combination thereof. The one or more optional user interfaces receive input from a user, provide output to a user (e.g., the graphical user interface discussed above), or a combination thereof. In some embodiments, as an alternative to or in addition to managing inputs and outputs through the one or more optional user interfaces, the server 100 may receive user input, provide an output (for example, the graphical user interface discussed above), or both by communicating with one or more devices, for example, the external device 114 and the internal device 116.

The external device 114 may be, for example, a console computer or a mobile device, communicating with the server 100 over a wired or wireless connection (for example, through the communication interface 108 of the server 100). The external device 114 accesses the server 100 outside of an enterprise network and outside of an enterprise firewall. In some examples, the external device 114 may be used by a user without administrator privileges to the server 100.

The internal device 116 may be, for example, a console computer or a mobile device, communicating with the server 100 over a wired or wireless connection (for example, through the communication interface 108 of the server 100). The internal device 116 accesses the server 100 inside an enterprise network and within an enterprise firewall. In some examples, the internal device 116 may be used by a user with administrator privileges to the server 100.

The third-party communication device 120 receives interference from one or more base stations of the plurality of base stations 112A-112N because of poor radio frequency (RF) filtering or other interference causing issues at the third-party communication device 120. The third-party communication device 120 may be a high-precision global positioning system (GPS) receiver, a high precision navigation and timing device, or other suitable navigation device.

Figure 2:
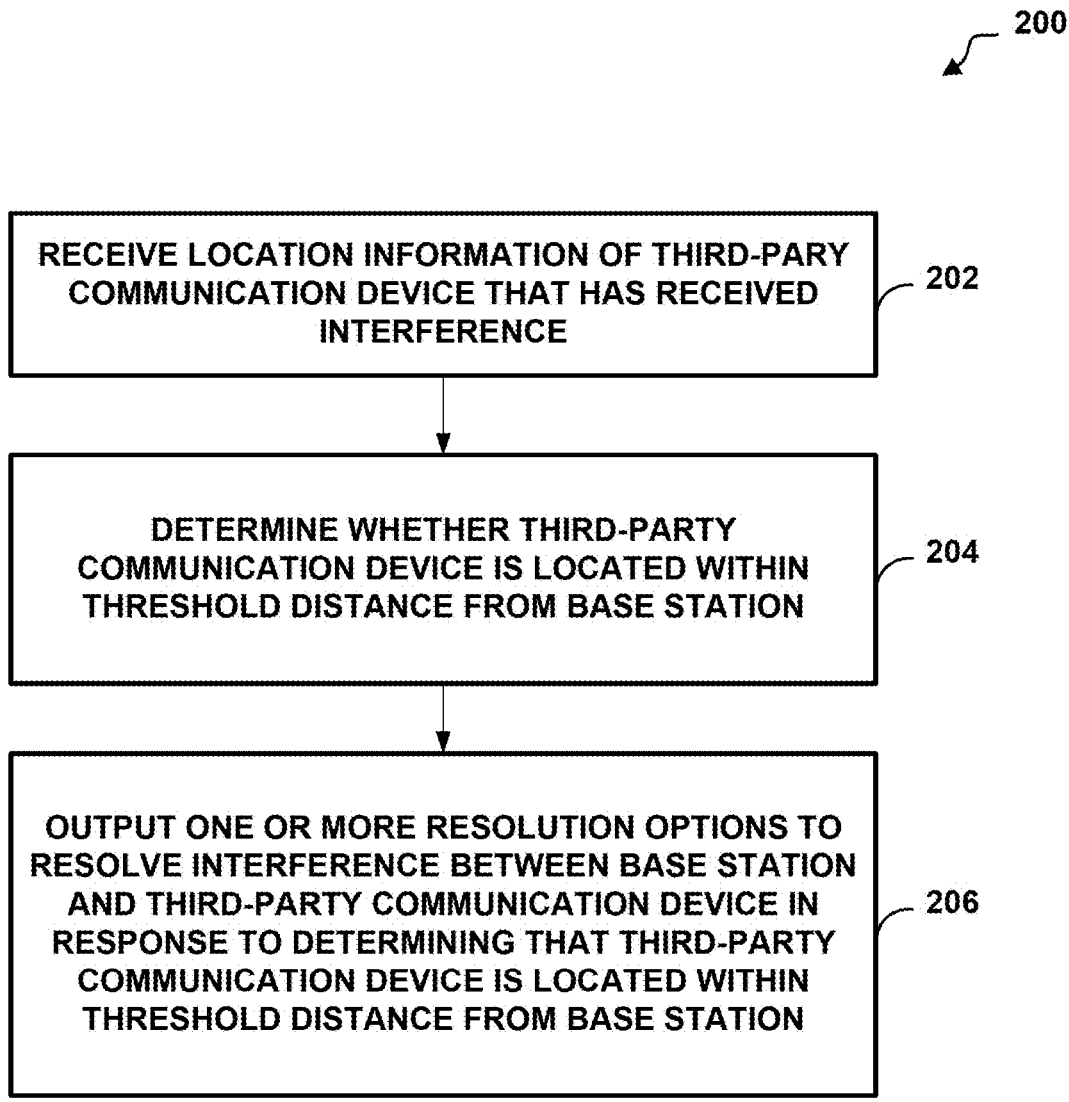
FIG. 2 is a flowchart illustrating a method for locating and resolving inadvertent interference with a third-party communication device, in accordance with various aspects of the present disclosure.

FIG. 2 is a flowchart illustrating a method 200 for locating and resolving inadvertent interference with a third-party communication device 120. In the example of FIG. 2, the electronic processor 102 receives location information (for example, latitude and longitude) regarding a third-party communication device 120 (for example, a high-precision global positioning system (GPS) receiver) that has received interference (at block 202). For example, the electronic processor 102 receives the location information regarding the third-party communication device from a user via the external device 114 or the internal device 116. Additionally, in some examples, the interference that is received by the third-party communication is harmful interference due to poor RF filtering on the third-party communication device 120.

The electronic processor 102 executes the location and resolution program 108 to determine whether the third-party communication device 120 is within a threshold distance from a base station (e.g., one of the plurality of base stations 112A-112N) (at block 204). The threshold distance based on an interference radius associated with the base station. For example, the electronic processor may determine whether the third-party communication device 120 is within the threshold distance 302 from the base station 112A as illustrated in FIG. 3.

The electronic processor 102 outputs one or more resolution options to a user (e.g., a user of the server 100 and/or a user of the internal device 116) in response to determining that the location of the third-party communication device 120 is within the threshold distance from the base station (at block 206). In some examples, the one or more resolution options include an option to reduce the broadcast power or signal strength of the base station by a first amount. Additionally, in some examples, the one or more resolution options may include an option to issue a service request to a technician that services the base station 112A, an option to shut down and replace the base station, or replace the poorly filtered third-party communication device 120. In some examples, the electronic processor 102 may output previously identified information with the one or more resolution options, the previously information including a serial number and a model number of any third-party communication devices that have previously been identified as poorly-filtered third-party communication devices.

In some examples, the method 200 may also include determining whether the third-party communication device is located within a threshold distance from a second base station, the threshold distance based on a first interference radius associated with the second base station and outputting a second one or more resolution options to resolve interference between the second base station and the third-party communication device in response to determining that the third-party communication device is located within the threshold distance from the second base station.

In these examples, the second one or more resolution options may include an option to reduce the broadcast power or signal strength of the second base station by a first amount, an option to issue a service request to a technician that services the second base station, an option to shut down and replace the second base station, replace the poorly filtered third-party communication device 120, or a combination thereof. In some examples, the electronic processor 102 may output the previously identified information as described above with the second one or more resolution options.

Additionally, the method 200 may also include outputting a third one or more resolution options to resolve interference between the base station, the second base station, and the third-party communication device in response to determining that the third-party communication device is located within the threshold distance from the base station and the threshold distance from the second base station.

In some examples, the third one or more resolution options may include an option to reduce the broadcast power or signal strength of the base station by a second amount and the second base station by a second amount, an option to issue a service request to a technician that services the base station and/or the second base station, an option to shut down the base station and the second base station, replace the poorly filtered third-party communication device 120, or another suitable option that resolves the interference between the base station, the second base station, and the third-party communication device, or a combination thereof. In some examples, the electronic processor 102 may output the previously identified information as described above with the third one or more resolution options.

Alternatively, in other examples, the method 200 may include determining whether the third-party communication device is located within a second threshold distance from the base station, the second threshold distance based on a second interference radius associated with the base station that is different than the first interference radius. For example, the electronic processor may determine whether the third-party communication device 120 is within the second threshold distance 304 from the base station 112A as illustrated in FIG. 3. In these examples, the method 200 includes outputting a second one or more resolution options to resolve interference between the base station and the third-party communication device in response to determining that the third-party communication device is located within the second threshold distance from the base station, the second one or more resolution options being different than the one or more resolution options.

In these other examples, the second one or more resolution options may include an option to reduce the broadcast power or signal strength of the base station by a third amount, an option to issue a service request to a technician that services the base station, an option to shut down and replace the base station, replace the poorly filtered third-party communication device 120, or another suitable option that resolves the interference between the base station and the third-party communication device, or a combination thereof. In some examples, the electronic processor 102 may output the previously identified information as described above with the second one or more resolution options.

Additionally, the method 200 may also include determining whether the third-party communication device is located within a third threshold distance from the base station, the third threshold distance based on a third interference radius associated with the base station that is different than the first interference radius and the second interference radius. For example, the electronic processor may determine whether the third-party communication device 120 is within the third threshold distance 306 from the base station 112A as illustrated in FIG. 3. In these examples, the method 200 includes outputting a third one or more resolution options to resolve interference between the base station and the third-party communication device in response to determining that the third-party communication device is located within the third threshold distance from the base station, wherein the third one or more resolution options is different than the one or more resolution options and the second one or more resolution options.

In some examples, the third one or more resolution options may include an option to reduce the broadcast power or signal strength of the base station by a fourth amount, an option to issue a service request to a technician that services the base station, an option to shut down and replace the base station, replace the poorly filtered third-party communication device 120, or another suitable option that resolves the interference between the base station and the third-party communication device, or a combination thereof. In some examples, the electronic processor 102 may output the previously identified information as described above with the third one or more resolution options.

Alternatively, in these other examples, the method 200 may also include determining whether the third-party communication device is located within a third threshold distance from a second base station, the third threshold distance based on a first interference radius associated with the second base station and outputting a third one or more resolution options to resolve interference between the base station, the second base station, and the third-party communication device in response to determining that the third-party communication device is located within the second threshold distance from the base station and the third threshold distance from the second base station, wherein the third one or more resolution options is different than the one or more resolution options and the second one or more resolution options.

In these other examples, the third one or more resolution options may include an option to reduce the broadcast power or signal strength of the base station by a fifth amount and the second base station by a third amount, an option to issue a service request to a technician that services the base station and/or the second base station, an option to shut down and replace the second base station, replace the poorly filtered third-party communication device 120, or another suitable option that resolves the interference between the base station, the second base station, and the third-party communication device, or a combination thereof. In some examples, the electronic processor 102 may output the previously identified information as described above with the third one or more resolution options.

The method 200 may also include requesting a signal strength of the base station from the base station, requesting landscape parameters of landscape surrounding the base station, and determining the threshold distance based on the first interference radius that is calculated from at least one of the signal strength or the landscape parameters.

Thus, the present disclosure provides, among other things, devices, methods, and systems for locating and resolving inadvertent interference with third-party communication devices. Various features and advantages of the present disclosure are set forth in the following claims.

What is claimed is:

1. A server comprising:
    a communication interface configured to communicate with one or more base stations that transmit information via a first wireless network and at least one of an internal device or an external device,
    a memory, and
    an electronic processor communicatively connected to the memory, the electronic processor configured to
        receive location information of a third-party communication device from the at least one of the internal device or the external device, the third-party communication device being separate and distinct from the at least one of the internal device or the external device, and the third-party communication device being part of a second wireless network that is different from the first wireless network in that the second wireless network does not share communication protocols with the first wireless network, wherein the third-party communication device does not share a same gateway radio node with the one or more base stations, and wherein the third-party communication device has received interference from the one or more base stations of the first wireless network and that is the only interaction between the third-party communication device and the one or more base stations,
        determine whether the third-party communication device is located within a threshold distance from a base station of the one or more base stations based on the location information that is received, the threshold distance based on a first interference radius associated with the base station, and
        output one or more resolution options to resolve the interference between the base station and the third-party communication device in response to determining that the third-party communication device is located within the threshold distance from the base station.

2. The server of claim 1, wherein the electronic processor is further configured to
    determine whether the third-party communication device is located within a threshold distance from a second base station based on the location information that is received, the threshold distance based on a first interference radius associated with the second base station, and
    output a second one or more resolution options to resolve the interference between the second base station and the third-party communication device in response to determining that the third-party communication device is located within the threshold distance from the second base station.

3. The server of claim 2, wherein the electronic processor is further configured to
output a third one or more resolution options to resolve the interference between the base station, the second base station, and the third-party communication device in response to determining that the third-party communication device is located within the threshold distance from the base station and the threshold distance from the second base station.

4. The server of claim 1, wherein the electronic processor is further configured to
determine whether the third-party communication device is located within a second threshold distance from the base station based on the location information that is received, the second threshold distance based on a second interference radius associated with the base station that is different than the first interference radius, and
output a second one or more resolution options to resolve the interference between the base station and the third-party communication device in response to determining that the third-party communication device is located within the second threshold distance from the base station, wherein the second one or more resolution options is different than the one or more resolution options.

5. The server of claim 4, wherein the electronic processor is further configured to
determine whether the third-party communication device is located within a third threshold distance from the base station based on the location information that is received, the third threshold distance based on a third interference radius associated with the base station that is different than the first interference radius and the second interference radius, and
output a third one or more resolution options to resolve the interference between the base station and the third-party communication device in response to determining that the third-party communication device is located within the third threshold distance from the base station, wherein the third one or more resolution options is different than the one or more resolution options and the second one or more resolution options.

6. The server of claim 4, wherein the electronic processor is further configured to
determine whether the third-party communication device is located within a third threshold distance from a second base station based on the location information that is received, the third threshold distance based on a first interference radius associated with the second base station, and
output a third one or more resolution options to resolve the interference between the base station, the second base station, and the third-party communication device in response to determining that the third-party communication device is located within the second threshold distance from the base station and the third threshold distance from the second base station, wherein the third one or more resolution options is different than the one or more resolution options and the second one or more resolution options.

7. The server of claim 1, wherein the electronic processor is further configured to
request a signal strength of the base station from the base station,
request landscape parameters of landscape surrounding the base station, and
determine the threshold distance from the first interference radius that is calculated using the landscape parameters,
wherein the landscape parameters include parameters of at least one of buildings, mountains, hills, a city environment, a forest environment, or a water environment.

8. The server of claim 1, wherein the one or more resolution options includes an option for reducing a signal strength of the base station by a specified amount.

9. The server of claim 1, wherein the third-party communication device is a receive-only communication device.

10. A method for locating and resolving inadvertent interference received by a third-party communication device that is part of a second wireless network, the method comprising:
receiving, with an electronic processor, location information of the third-party communication device from at least one of an internal device or an external device, the third-party communication device being separate and distinct from the at least one of the internal device or the external device, and the third-party communication device having received interference from a base station that is part of a first wireless network that is different from the second wireless network in that the second wireless network does not share communication protocols with the first wireless network, and wherein the third-party communication device does not share a same gateway radio node with the base station;
determining, with the electronic processor, whether the third-party communication device is located within a threshold distance from the base station based on the location information that is received, the threshold distance being based on a first interference radius associated with the base station; and
outputting, with the electronic processor, one or more resolution options to resolve the interference between the base station and the third-party communication device in response to determining that the third-party communication device is located within the threshold distance from the base station,
wherein the interference from the base station is the only interaction between the base station and the third-party communication device.

11. The method of claim 10, further comprising:
determining whether the third-party communication device is located within a threshold distance from a second base station based on the location information that is received, the threshold distance based on a first interference radius associated with the second base station; and
outputting a second one or more resolution options to resolve the interference between the second base station and the third-party communication device in response to determining that the third-party communication device is located within the threshold distance from the second base station.

12. The method of claim 11, further comprising:
outputting a third one or more resolution options to resolve the interference between the base station, the second base station, and the third-party communication device in response to determining that the third-party communication device is located within the threshold distance from the base station and the threshold distance from the second base station.

13. The method of claim 10, further comprising:
determining whether the third-party communication device is located within a second threshold distance from the base station based on the location information that is received, the second threshold distance based on a second interference radius associated with the base station that is different than the first interference radius; and
outputting a second one or more resolution options to resolve the interference between the base station and the third-party communication device in response to determining that the third-party communication device is located within the second threshold distance from the base station, wherein the second one or more resolution options is different than the one or more resolution options.

14. The method of claim 13, further comprising:
determining whether the third-party communication device is located within a third threshold distance from the base station based on the location information that is received, the third threshold distance based on a third interference radius associated with the base station that is different than the first interference radius and the second interference radius; and
outputting a third one or more resolution options to resolve the interference between the base station and the third-party communication device in response to determining that the third-party communication device is located within the third threshold distance from the base station, wherein the third one or more resolution options is different than the one or more resolution options and the second one or more resolution options.

15. The method of claim 13, further comprising:
determining whether the third-party communication device is located within a third threshold distance from a second base station based on the location information that is received, the third threshold distance based on a first interference radius associated with the second base station; and
outputting a third one or more resolution options to resolve the interference between the base station, the second base station, and the third-party communication device in response to determining that the third-party communication device is located within the second threshold distance from the base station and the third threshold distance from the second base station, wherein the third one or more resolution options is different than the one or more resolution options and the second one or more resolution options.

16. The method of claim 10, further comprising:
requesting a signal strength of the base station from the base station;
requesting landscape parameters of landscape surrounding the base station; and
determining the threshold distance from the first interference radius that is calculated using the landscape parameters,
wherein the landscape parameters include parameters of at least one of buildings, mountains, hills, a city environment, a forest environment, or a water environment.

17. The method of claim 10, wherein the one or more resolution options includes an option for reducing a signal strength of the base station by a specified amount.

18. A system comprising:
a third-party communication device;
at least one of an internal device or an external device;
a base station; and
a server including
a communication interface configured to communicate with the at least one of the internal device or the external device and one or more base stations that transmit information via a first wireless network, the one or more base stations including the base station,
a memory, and
an electronic processor communicatively connected to the memory, the electronic processor configured to
receive location information of the third-party communication device from the at least one of the internal device or the external device, the third-party communication device being separate and distinct from the at least one of the internal device or the external device, and the third-party communication device being part of a second wireless network that is different from the first wireless network in that the second wireless network does not share communication protocols with the first wireless network, wherein the third-party communication device does not share a same gateway radio node with the one or more base stations, and wherein the third-party communication device has received interference from the one or more base stations of the first wireless network and that is the only interaction between the third-party communication device and the one or more base stations,
determine whether the third-party communication device is located within a threshold distance from the base station based on the location information that is received, the threshold distance based on a first interference radius associated with the base station, and
output one or more resolution options to resolve the interference between the base station and the third-party communication device in response to determining that the third-party communication device is located within the threshold distance from the base station.

19. The system of claim 18, wherein the electronic processor is further configured to
determine whether the third-party communication device is located within a second threshold distance from the base station based on the location information that is received, the second threshold distance based on a second interference radius associated with the base station that is different than the first interference radius, and
output a second one or more resolution options to resolve the interference between the base station and the third-party communication device in response to determining that the third-party communication device is located within the second threshold distance from the base station, wherein the second one or more resolution options is different than the one or more resolution options.

20. The system of claim 19, wherein the electronic processor is further configured to
determine whether the third-party communication device is located within a third threshold distance from the base station based on the location information that is received, the third threshold distance based on a third interference radius associated with the base station that is different than the first interference radius and the second interference radius, and output a third one or more resolution options to resolve the interference between the base station and the third-party communication device in response to determining that the third-party communication device is located within the third threshold distance from the base station, wherein the third one or more resolution options is different than the one or more resolution options and the second one or more resolution options.

21. The system of claim 19, wherein the electronic processor is further configured to
determine whether the third-party communication device is located within a third threshold distance from a second base station based on the location information that is received, the third threshold distance based on a first interference radius associated with the second base station, and output a third one or more resolution options to resolve the interference between the base station, the second base station, and the third-party communication device in response to determining that the third-party communication device is located within the second threshold distance from the base station and the third threshold distance from the second base station, wherein the third one or more resolution options is different than the one or more resolution options and the second one or more resolution options.

* * * * *